United States Patent
Chen et al.

(10) Patent No.: US 6,283,100 B1
(45) Date of Patent: Sep. 4, 2001

(54) METHOD AND SYSTEM FOR CONTROLLING A COMPRESSION IGNITION ENGINE DURING PARTIAL LOAD CONDITIONS TO REDUCE EXHAUST EMISSIONS

(75) Inventors: Gong Chen; Michael Shawn Gallagher; Eric Dillen, all of Erie, PA (US)

(73) Assignee: General Electric Company

( * ) Notice: Subject to any disclaimer, the term of this patent is extended or adjusted under 35 U.S.C. 154(b) by 0 days.

(21) Appl. No.: 09/553,411

(22) Filed: Apr. 20, 2000

(51) Int. Cl.⁷ .............................. F02D 23/02; F02B 29/04

(52) U.S. Cl. .............................................. 123/563; 60/599

(58) Field of Search ................................ 123/563, 41.31; 60/599

(56) References Cited

U.S. PATENT DOCUMENTS

| | | |
|---|---|---|
| 3,397,684 | 8/1968 | Scherenberg . |
| 3,621,907 | 11/1971 | Ephraim, Jr. et al. . |
| 3,648,715 | 3/1972 | Boothe . |
| 3,771,293 | 11/1973 | Vest . |
| 3,863,612 | 2/1975 | Wiener . |
| 4,061,187 | 12/1977 | Rajasekaran et al. . |
| 4,133,185 | 1/1979 | Dickey . |
| 4,231,384 | 11/1980 | Christensen . |
| 4,413,595 | 11/1983 | Potts, Jr. . |

(List continued on next page.)

FOREIGN PATENT DOCUMENTS

| | | |
|---|---|---|
| 0 389 592 B1 | 3/1993 | (EP) . |
| 0 499 071 B1 | 8/1994 | (EP) . |
| 0 721 060 A2 | 7/1996 | (EP) . |
| 0 857 958 A1 | 8/1998 | (EP) . |
| 0 875 631 A1 | 11/1998 | (EP) . |
| 08186926 A | 7/1996 | (JP) . |
| 09195777 A | 7/1997 | (JP) . |

OTHER PUBLICATIONS

R. A. Nutt and R. F. Poehlman; Cooling System Requuirements for Advanced Diesel Engines; SAE The Engineering Resource For Advancing Mobility West Coast International Meeting Aug. 16–19, 1992.

Jean–Pierre Moranne & Jerome J. Lukas; Air–to–Air Turbocharged Air Cooling Versus Air–to–Water Turbocharged Air Cooling; SAE The Engineering Resource For Advanced Mobility; International Congress & Exposition Feb. 27–Mar. 2, 1984.

Geoffrey Bond & Robert M. Brooks; Selection of the Optimized Aftercooling System for Cummins Premium Diesel Engines; SAE The Engineering Resource For Advanced Mobility; West Coast International Meeting & Exposition Aug. 6–9, 1984.

*Primary Examiner*—Tony M. Argenbright
(74) *Attorney, Agent, or Firm*—Carl A. Rowold, Esq.; Enrique J. Mora, Esq.; Beusse, Brownlee, Bowdoin & Wolter PA

(57) ABSTRACT

A method and system for controlling a compression ignition engine in railroad locomotives and other land or marine-based large propulsion or power generation equipment operable in a selected one of a plurality of engine throttle notches is provided. Each throttle notch is indicative of a respective load condition of the engine. The engine has an intercooling system using a predetermined cooling fluid and the engine is configured to receive a predetermined combustion-supporting fluid (e.g., air) into a plurality of cylinders through respective intake manifolds. The method allows for sensing the selected throttle notch, and for selectively actuating the intercooling system to adjust a predetermined operational parameter (e.g., intake manifold air temperature) based on the sensed throttle notch and/or environmental conditions.

67 Claims, 2 Drawing Sheets

U.S. PATENT DOCUMENTS

| | | |
|---|---|---|
| 4,563,983 * | 1/1986 | Hayashi et al. .................. 123/563 X |
| 4,592,323 | 6/1986 | Vest . |
| 4,656,973 | 4/1987 | Endres . |
| 4,711,204 | 12/1987 | Rusconi . |
| 4,894,780 | 1/1990 | Simonyi et al. . |
| 4,907,645 | 3/1990 | Dumas et al. . |
| 4,955,431 | 9/1990 | Saur et al. . |
| 4,961,404 | 10/1990 | Itakura et al. . |
| 5,036,803 | 8/1991 | Nolting et al. . |
| 5,119,795 * | 6/1992 | Goto et al. .......................... 123/563 |
| 5,201,285 | 4/1993 | McTaggart . |
| 5,353,757 | 10/1994 | Susa et al. . |
| 5,392,741 | 2/1995 | Uzkan . |
| 5,415,147 | 5/1995 | Nagle et al. . |
| 5,566,745 | 10/1996 | Hill et al. . |
| 5,598,705 | 2/1997 | Uzkan . |
| 5,669,311 | 9/1997 | Hill et al. . |
| 5,791,316 * | 8/1998 | Houtz et al. ..................... 123/563 X |
| 5,828,967 | 10/1998 | Ueda . |
| 6,006,731 | 12/1999 | Uzkan . |

* cited by examiner

METHOD AND SYSTEM FOR CONTROLLING A COMPRESSION IGNITION ENGINE DURING PARTIAL LOAD CONDITIONS TO REDUCE EXHAUST EMISSIONS

BACKGROUND OF THE INVENTION

The present invention is generally related to control systems and techniques for controlling compression ignition engines, and, more particularly, the present invention is related to a control system and method for reducing exhaust emissions and improving engine efficiency, specially during partial load conditions of the engine.

In a typical turbocharged or supercharged diesel engine, the engine inlet air may be compressed in a turbocharger or supercharger compressor and then passed through an intercooler to a respective intake manifold prior to being drawn into a respective cylinder of the engine. As will be appreciated by those skilled in the art, a locomotive engine may be operable at a plurality of different throttle positions or notches. In general, a notch specifies a commanded engine speed and/or power and results in a given load and/or speed condition for the engine. For example, there may be eight power positions or notches (N), plus idle. Notch N1 may correspond to the minimum desired engine speed and power, while notch N8 may correspond to maximum speed and full power.

When the engine is operating at or near full speed and load, the temperature of the air discharged by the compressor may be high relative to a coolant fluid circulated through the intercooler, and thus such air would be desirably cooled in the intercooler. Conversely, while the engine operates during partial load conditions, e.g., from notch N1 to a predetermined intermediate notch position or at the idle notch position, the temperature of the compressor-discharge air may be low compared to the intercooler coolant. Under presently known engine control techniques used during partial engine load conditions, the compressed air may be conditioned in the intercooler to about the same temperature level of the engine cylinders coolant and lubrication oil regardless of whether a resulting intake manifold air temperature (IMAT) corresponds to a reduced level of exhaust emissions or an optimal combustion efficiency in the cylinders of the engine, that is, such techniques do not allow for adjusting IMAT to optimize in-cylinder combustion and heat release and consequently exhaust emissions and engine efficiency may be somewhat less than optimal. Thus, such presently known control techniques do not take advantage of the fact that engine output performance and exhaust emissions may be positively affected by appropriate control of IMAT at partial or relatively low load conditions. For example, as the engine is operated in a respective partial load condition, selectably lowering manifold air temperature could reduce engine exhaust emissions including not only nitrogen oxides ($NO_x$), but also carbon monoxide (CO), smoke and other pollutants.

In view of the foregoing considerations, it is desirable to reduce exhaust emissions and improve the output performance of such engines particularly when operating at partial load conditions.

SUMMARY OF THE INVENTION

Generally speaking, the present invention fulfills the foregoing needs by providing a method for controlling a compression-ignition engine in large equipment, such as locomotives, marine vessels, off-road vehicles, and power generation equipment, operable in a selected one of a plurality of engine throttle notches. Each throttle notch is indicative of a respective load and/or speed condition of the engine. The engine has an intercooling system using a predetermined cooling fluid and the engine is configured to receive a predetermined combustion-supporting fluid (e.g., air) into a plurality of cylinders through a respective intake manifold. The method allows for sensing the selected throttle notch, and for selectively actuating the intercooling system to adjust a predetermined operational parameter (e.g., intake manifold air temperature) based on the sensed throttle notch.

The present invention may further fulfill the foregoing needs by providing in one exemplary embodiment a control system for controlling a compression-ignition engine operable in a selected one of a plurality of engine throttle notches. Each throttle notch may be indicative of a respective load and/or speed condition of the engine. The engine has an intercooling system using a predetermined cooling fluid. The engine is configured to receive a predetermined combustion-supporting fluid into a plurality of cylinders through a respective intake manifold. The system comprises a sensor coupled to sense the selected throttle notch. The system further comprises one or more sensors respectively coupled to sense a predetermined parameter indicative of a respective ambient condition, and a control module configured to selectively actuate the intercooling system to adjust one or more predetermined operational parameters based on the sensed throttle notch and/or the value of the respective parameters indicative of the ambient condition.

Figure 1:
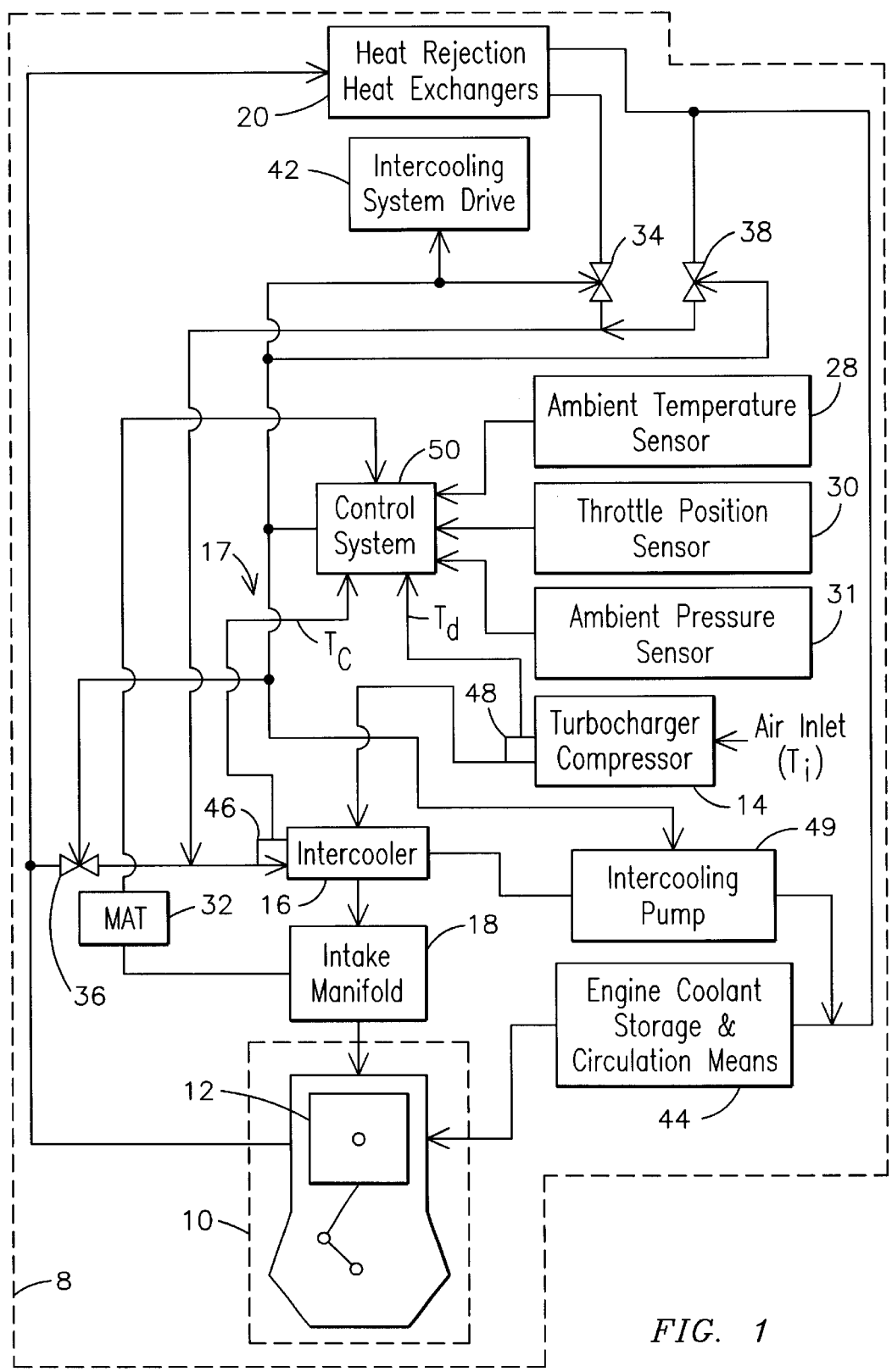
FIG. 1 shows a schematic block diagram of an exemplary control system embodying the present invention for providing engine control, particularly during partial load conditions of the engine.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

As illustrated in FIG. 1, large land-based or marine-based equipment 8, such as locomotives, haul off-road vehicles, marine vessels, and power generation equipment, may include a compression-ignition engine 10, such as a medium-speed (e.g., from about 300 RPM to about 1200 RPM) turbocharged or supercharged diesel engine, that may be used as a prime mover. Engine 10 may be constructed in fashion well-known to those skilled in the art to operate at a selected one of a plurality of discrete levels of engine load and/or speed. The selected engine speed and/or load is set, within permissible limits, by a manually operated lever or handle of a throttle that can be selectively moved in a plurality of steps, e.g., eight steps or "notches" between a low power position (N1) and a maximum power position (N8). The throttle handle is part of the control console located in the operator's cab of the locomotive. It is envisioned that the notch setting could be automatically controlled in lieu of being manually controlled. In addition to the eight conventional power notches, the handle has an "idle" position. In typical locomotive configurations, ambient temperature ($T_a$) may be indicative of an engine inlet air temperature ($T_i$). Thus, in some applications one could sense ambient temperature to obtain a measurement indicative of temperature $T_i$. It will be appreciated, however, that in other applications ambient temperature may not be indicative of inlet air temperature $T_i$, such as may occur where inlet air temperature $T_i$ is preconditioned due to the configuration of the locomotive.

In engine 10, the inlet air is compressed, as is known in the art, using a compressor 14, such as a turbocharger or a supercharger compressor, and then cooled by an intercooler 16, which is part of an intercooling system 17, and passes through a respective intake manifold 18 prior to being drawn into cylinder 12. A fluid coolant used by the intercooling system is circulated to one or more intercooling radiators or heat exchangers 20 so that heat absorbed from the compressed air is carried by the coolant to the radiator and transferred to the environment. The present invention recognizes that the engine combustion efficiency and level of exhaust emissions may be influenced by the temperature of intake manifold air, which is typically the air delivered by intercooler 16 prior to entering cylinder 12. As will be appreciated by those skilled in the art, one can analytically, empirically and/or experimentally determine a respective functional relation or model between intake manifold air temperature (IMAT) and other operational parameters of the intercooler system. Consistent with general usage in the art of locomotives, the acronym MAT that stands for manifold air temperature may be used interchangeable with the acronym IMAT unless otherwise indicated in the description that follows. Examples of such operational parameters may include thermal properties of the intercooler coolant, such as its temperature and/or flow rate. Thus, it will be appreciated that, in addition to or in lieu of sensing and controlling IMAT, one could sense and control such other operational parameters of the intercooler system to influence the level of exhaust emissions and combustion efficiency of the engine. Other exemplary operational parameter that may be sensed and related to IMAT may be temperature of the air discharged by turbocharger or supercharger compressor 14, ($T_d$).

As suggested above, it is desirable to reduce the level of exhaust emissions and improve the output efficiency of turbocharged or supercharged diesel engines particularly while operating during partial load conditions. In one aspect of the present invention, a method for controlling a compression-ignition engine allows for implementing the following exemplary steps: A step for sensing throttle notch position. If desired, a step for sensing one or more predetermined parameters indicative of a respective ambient condition, e.g., ambient temperature Ta and/or inlet temperature $T_i$, barometric pressure, etc. If desired, a step for sensing temperature Td of air discharged by compressor 14. A step for selecting a desired IMAT value and/or a desired intercooler parameter value, e.g., coolant temperature ($T_c$) as a function of the throttle notch position. It will be appreciated that the IMAT value and/or desired intercooler parameter value could be optionally selected as a function of the sensed ambient condition in combination with the throttle notch position. As suggested above, the IMAT value could be further selected as a function of the sensed temperature $T_d$ of air discharged by compressor 14 in the event that option is implemented in a given configuration. If desired, a step for sensing the actual IMAT value and/or the actual intercooler parameter value. A step for selectively actuating the intercooling system based on the value of the notch position and/or the sensed ambient condition; or optionally selectively actuating the intercooling system based on the value of the actual IMAT value compared to the desired IMAT value, or the actual intercooler parameter value compared to the desired intercooler parameter value. A step for actuating and/or speeding up the intercooling system operation as the actual IMAT value is higher than the desired IMAT value and/or the actual intercooler parameter value is higher than the desired intercooler parameter value. The foregoing step may further include turning off or slowing down the intercooling system operation when the actual IMAT value is lower than the desired IMAT value and/or the actual intercooler parameter value is lower than the desired intercooler parameter value. For example, the flow rate of the coolant fluid and/or valve positions may be controlled to achieve the desired IMAT value. A step for updating the desired value of IMAT and/or desired value of intercooler parameter values as a unction of changes in notch position, and/or ambient conditions. A step for returning to a standard intercooling operation as needed, such as when the engine is operating at higher loads or near or at a full load condition.

The method of the present invention as described above may be implemented with an exemplary control system 50, as shown in FIG. 1. During such implementation, ambient temperature $T_a$ and/or inlet temperature $T_i$ may be respectively monitored and sensed by respective temperature sensing means 28 installed at predetermined locations in the machine, such as the inlet air compartment, or the air path that delivers air to compressor 14. Further, a throttle position sensor is used for determining the throttle notch, e.g., throttle notch position, and a barometric pressure sensor 31 may be used for determining atmospheric pressure. As will be appreciated by those skilled in the art, in a general case, the radiator heat exchangers 20 for the intercooler coolant can be fluidly coupled either in common with radiators used for cooling cylinder/oil coolant, or to radiators dedicated to the intercooler coolant. In each case, the specific throttle notch positions at which the intercooler system needs to be actuated to reach the desired IMAT value are determined and specified in a suitable memory unit 52 (FIG. 2), such as a look-up table in control system 50. It will be appreciated that the actuation of the intercooling system could be further based on the sensed ambient conditions in combination with the sensed notch position. Optionally, actual IMAT values, such as may be sensed by an IMAT temperature sensor 32 may be adjusted as a function of the desired IMAT value corresponding to a given engine throttle notch, ambient conditions and/or the level of temperature $T_d$ of air discharged by compressor 14. The desired IMAT values, as a function of engine throttle notch, ambient conditions, and/or the level of temperature $T_d$ may be similarly stored in a multi-dimensional look-up table. By way of example and not of limitation, a plurality of valves, e.g., valves 34, 36 and 38 and/or intercooling pump 49, may be actuated in the intercooling system in response to respective actuating signals from control system 50 depending on the sensed throttle notch and/or ambient condition, or, as suggested above, depending on the desired value of IMAT relative to the actual value of IMAT for a given engine throttle notch and/or ambient condition. Similarly, an intercooling system drive 42 that may energize one or more radiator fans (not shown), intercooling pump 49, and/or circulation means 44, such as one or more pumps coupled to a respective coolant circulation device, may be selectively actuated in response to respective actuating signals from control system 50 depending on the sensed throttle notch and/or ambient condition; or, depending on the desired value of IMAT value relative to the actual value of IMAT for a given throttle notch and/or ambient condition.

By way of example and assuming radiators are dedicated to the coolant fluid of the intercooler, when engine 10 is operating at high load notches, valve 34 positioned between the outlet of radiator heat exchanger 20 and the inlet of intercooler 16 may be actuated to be in a respective open position. Conversely, valve 36, positioned between a downstream coolant flow path of the engine an the intercooler inlet, and valve 38, positioned between an upstream coolant flow path of the engine and the intercooler inlet, may each be actuated in a respective close position, to provide cooling in intercooler 16 for the air discharged from compressor 14, which air may be at a relatively high temperature. It will thus be appreciated that when the engine is operated in a partial load condition, which condition may result in the air discharged from compressor 14 to have a relatively low temperature, then exemplary valves 34, 36 and 38, circulation means 44 and/or intercooling pump 49 may be respectively controlled to adjust the actual value of IMAT to be within a predetermined band about the desired values of IMAT. Thus, using control techniques that may be readily adaptable by those of ordinary skill in the art to any particular intercooler system implementation, IMAT can be selectively controlled to be higher, lower or the same relative to the compressor-discharge air temperature at a given partial load/speed condition and at a given ambient condition. Thus, it will be appreciated that due to such IMAT control, the present invention allows for reducing exhaust emissions while improving engine efficiency, particularly at partial engine loads based on the throttle notch and environmental conditions, such as ambient temperature and/or barometric pressure.

Figure 2:
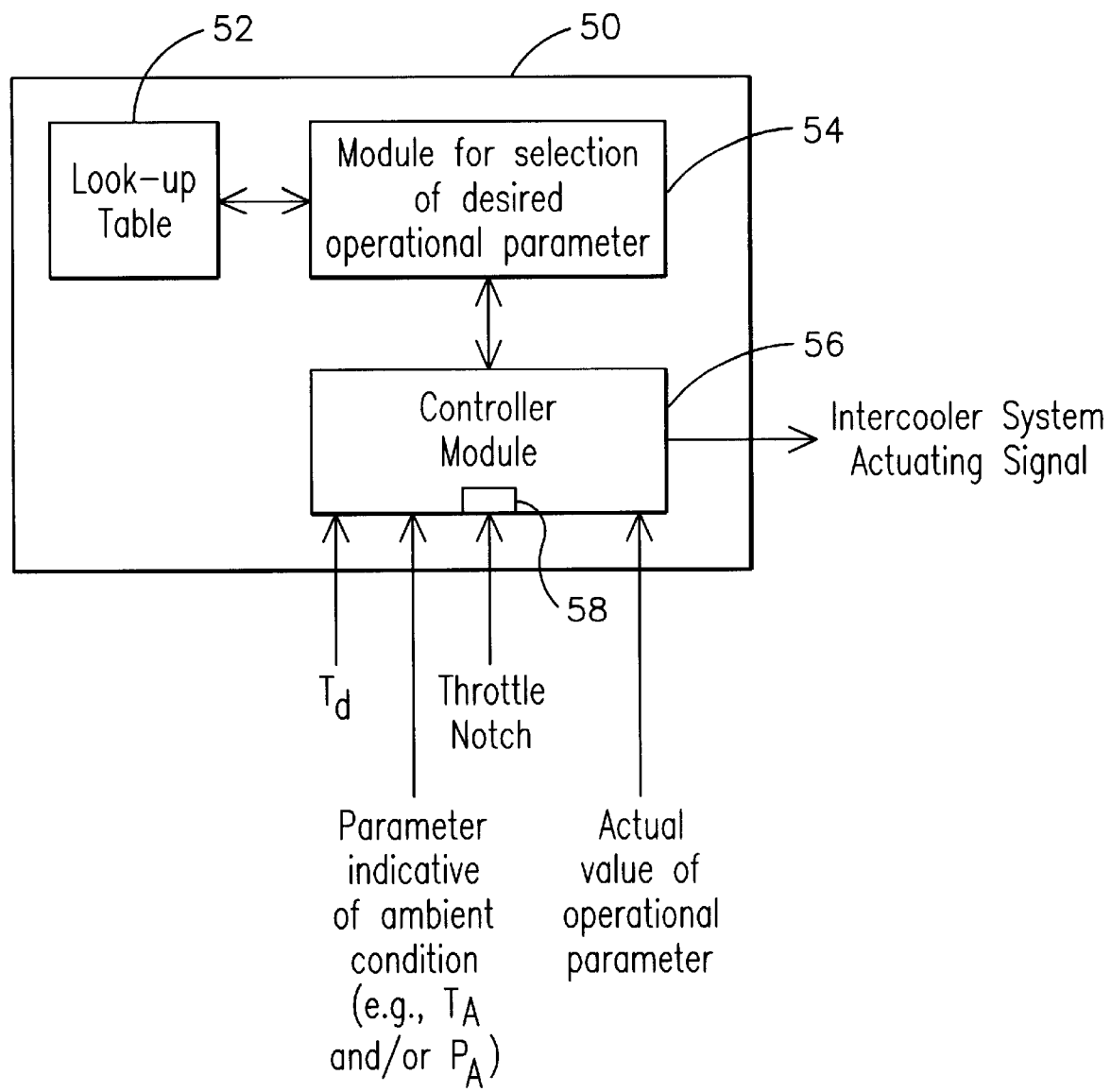
FIG. 2 shows further details in connection with the control system of FIG. 1.

As best appreciated in FIG. 2, in one preferred embodiment, the desired values of manifold air temperature IMAT, and/or desired values of intercooler operational parameters, such as coolant temperature ($T_c$), may be stored in memory unit 52 as a function of throttle notch, ambient conditions and/or temperature $T_d$ such as may be sensed by sensing means 48 (FIG. 1). Memory unit 52 is coupled to a module 54 for selecting a desired IMAT value and/or the desired values of the intercooler operational parameters. Memory unit 52 may further store a suitable intercooling system actuation strategy for achieving the desired IMAT value and/or desired value of the intercooler operational parameters. By way of example, the control strategy may be chosen for determining which particular valve will be in a respective close or open position, or for adjusting coolant flow rate. It will be appreciated by those skilled in the art that the valves need not be actuated in a fully open or closed position being that partially open valve positions could be used in the control strategy.

When the engine is operating at a particular ambient condition, e.g., temperature $T_a$ and/or pressure $P_a$, a controller module 56 receives the sensed value of $T_a$ and the sensed notch position and a corresponding desired value of IMAT, and/or desired value of other intercooler operational parameters, is selected by module 54 in response to the throttle notch and/or the ambient condition. An actual IMAT value and/or actual intercooler operational parameter value is sensed by respective sensing means 32 for sensing IMAT, or sensing means 46 for sensing coolant temperature $T_c$.

Each actual value is then compared in controller module 56 with the desired IMAT value and/or desired intercooler operational parameter value. The actuation and speed of the intercooling system operation is selectively controlled by the outcome of such comparison, e.g., based on the value of the difference between the actual and desired IMAT values. It will be appreciated that various control techniques, as will readily understood by one skilled in the art, may be used for controlling operation of the intercooling system based upon the results of the comparison. By way of example and not of limitation, step, differential, proportional plus integral, and other control techniques may be used for controlling operation of the intercooler system based on the comparison results. A submodule 58 may be used in controller module 56 for determining whether the selected notch corresponds to a partial load/speed condition in the engine. For example, this would allow control system 50 to return to a standard intercooling technique in case the engine is being operated at full load, for example.

It will now be appreciated that achieving the desired IMAT (and/or desired $T_c$) as may be executed by control system 50, would advantageously result in improved engine efficiency and lower exhaust emissions independently of engine load variations and actual environmental conditions, e.g., ambient temperature, atmospheric pressure, etc. It will be appreciated that the parameter indicative of environmental conditions need not be limited to ambient temperature or barometric pressure, being that other parameters indicative of ambient conditions could be incorporated to adjust IMAT.

As suggested above, in one preferred embodiment, controller module 56 may be adapted to actuate the intercooling system based on the value of the notch position and/or the value of respective ambient conditions using a control technique that will be readily recognized by those skilled in the art as comprising open loop control. It will be appreciated that the embodiment that senses error values between the actual and desired values of IMAT and/or $T_c$ would generally result in more accurate control of IMAT being that such embodiment will be recognized by those skilled in the art as comprising closed feedback control. By way of comparison, the open loop control embodiment that actuates the intercooling system based on the values of throttle notch and/or ambient conditions may be desirable in implementations where processing and storage requirements may be at a premium, and highly precise IMAT control is not a requirement. Regardless of its specific implementation, the present invention allows for reducing exhaust emissions and improving the output performance of such engines particularly when operating at partial load conditions by automatically optimizing the engine intake manifold air temperature based on the actual operational demands of the engine as well as the environmental conditions where the engine is being operated.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling a compression ignition engine, the engine operable in a selected one of a plurality of engine throttle notches, each throttle notch indicative of a respective load and/or speed condition of the engine, the engine having an intercooling system using a predetermined cooling fluid, the engine being configured to receive a predetermined combustion-supporting fluid into a plurality of cylinders through a respective intake manifold, the method comprising the steps of:

sensing the selected throttle notch; and selectively actuating the intercooling system to adjust a predetermined operational parameter based on the sensed throttle notch.

2. The method of claim 1 further comprising sensing a parameter indicative of a predetermined environmental condition to which the engine is exposed.

3. The method of claim 2 wherein the actuating step further comprises adjusting the predetermined operational parameter based on the value of the parameter indicative of the predetermined environmental condition.

4. The method of claim 2 wherein the sensed parameter indicative of the predetermined environmental condition is ambient temperature.

5. The method of claim 2 wherein the sensed parameter indicative of the predetermined environmental condition is inlet air temperature.

6. The method of claim 2 wherein the sensed parameter indicative of the predetermined environmental condition is barometric pressure.

7. The method of claim 1 wherein the predetermined combustion-supporting fluid is air.

8. The method of claim 1 wherein the predetermined operational parameter to be adjusted is intake manifold air temperature.

9. The method of claim 1 wherein the predetermined operational parameter to be adjusted is coolant fluid temperature.

10. The method of claim 1 wherein the predetermined operational parameter to be adjusted is intake manifold air temperature and/or coolant temperature.

11. The method of claim 2 further comprising sensing temperature of air discharged from a compressor so that the selectively actuating step of the intercooler system is further based on said sensed temperature.

12. The method of claim 7 wherein the actuating step of the intercooling system further comprises controlling flow of the cooling fluid to adjust the predetermined operational parameter.

13. The method of claim 1 further comprising sensing actual values of the predetermined operational parameter.

14. The method of claim 13 further comprising selecting a desired value of the predetermined operational parameter, the desired value of the predetermined operational parameter being selected based on the value of the parameter indicative of the predetermined environmental condition and the engine throttle notch.

15. The method of claim 14 further comprising a step of comparing the sensed value of the operational parameter against the desired value of that operational parameter.

16. The method of claim 15 wherein the actuating step of the intercooling system is based on the results of the comparison step to maintain the actual value of the operational parameter within a band corresponding to a respective engine throttle notch and environmental condition.

17. The method of claim 1 further comprising determining whether the sensed throttle notch corresponds to a partial engine load and/or speed condition.

18. The method of claim 1 wherein the engine is in one of the following equipment: railroad locomotives and other land-based vehicles, marine vessels and power generation equipment.

19. A method for controlling a medium-speed diesel engine, the engine operable in a selected one of a plurality of engine throttle notches, each throttle notch indicative of a respective load and/or speed condition of the engine, the engine having an intercooling system using a predetermined cooling fluid, the engine being configured to receive a predetermined combustion-supporting fluid into a plurality of cylinders through a respective intake manifold, the method comprising the steps of:

sensing the selected throttle notch;

sensing actual values of a predetermined operational parameter;

selecting a desired value of the predetermined operational parameter, the desired value of the predetermined operational parameter being selected based on the value of the throttle notch; and selectively actuating the intercooling system to adjust the predetermined operational parameter based on the difference between the respective values of the sensed operational parameter and the desired value of that operational parameter.

20. The method of claim 19 further comprising sensing a parameter indicative of a predetermined environmental condition to which the engine is exposed.

21. The method of claim 20 wherein the selecting step further comprises selecting the desired value of the predetermined operational parameter based on the value of the parameter indicative of the environmental condition.

22. The method of claim 20 wherein the sensed parameter indicative of the predetermined environmental condition is ambient temperature.

23. The method of claim 20 wherein the sensed parameter indicative of the predetermined environmental condition is inlet air temperature.

24. The method of claim 20 wherein the sensed parameter indicative of the predetermined environmental condition is barometric pressure.

25. The method of claim 19 wherein the predetermined combustion supporting fluid is air.

26. The method of claim 19 wherein the predetermined operational parameter to be adjusted is intake manifold air temperature.

27. The method of claim 19 wherein the predetermined operational parameter to be adjusted is coolant fluid temperature.

28. The method of claim 19 wherein the predetermined operational parameter to be adjusted is intake manifold air temperature and/or coolant temperature.

29. The method of claim 20 further comprising sensing temperature of air discharged from a compressor so that the selectively actuating step of the intercooler system is further based on said sensed temperature.

30. The method of claim 25 wherein the actuating step of the intercooling system further comprises controlling flow of the cooling fluid therein to adjust the predetermined operational parameter.

31. The method of claim 19 further comprising determining whether the sensed throttle notch corresponds to a partial engine load and/or speed condition.

32. The method of claim 19 wherein the engine is in one of the following equipment: locomotives and other large land-based vehicles, marine vessels and power generation equipment.

33. A control system for controlling a compression ignition engine, the engine operable in a selected one of a plurality of engine throttle notches, each throttle notch indicative of a respective load and/or speed condition of the engine, the engine having an intercooling system using a predetermined cooling fluid, the engine being configured to receive a predetermined combustion-supporting fluid into a plurality of cylinders through a respective intake manifold, the system comprising:

means for sensing the selected throttle notch; and means for selectively actuating the intercooling system to adjust a predetermined operational parameter based on the sensed throttle notch.

34. The system of claim 33 further comprising means for sensing a parameter indicative of a predetermined environmental condition to which the engine is exposed.

35. The system of claim 34 wherein the actuating step further comprises adjusting the predetermined operational parameter based on the value of the parameter indicative of the predetermined environmental condition.

36. The system of claim 34 wherein the sensed parameter indicative of the predetermined environmental condition is ambient temperature.

37. The system of claim 34 wherein the sensed parameter indicative of the predetermined environmental condition is inlet air temperature.

38. The system of claim 34 wherein the sensed parameter indicative of the predetermined environmental condition is barometric pressure.

39. The system of claim 33 wherein the predetermined combustion-supporting fluid is air.

40. The system of claim 33 wherein the operational parameter to be adjusted is intake manifold air temperature.

41. The system of claim 33 wherein the operational parameter to be adjusted is coolant fluid temperature.

42. The system of claim 33 wherein the operational parameter to be adjusted is intake manifold air temperature and/or coolant temperature.

43. The system of claim 34 further comprising means for sensing temperature of air discharged from a compressor so that the means for selectively actuating the intercooler system is further responsive to said sensed temperature.

44. The system of claim 33 further comprising means for controlling flow of the cooling fluid in the intercooling system to adjust the predetermined operational parameter.

45. The system of claim 33 further comprising means for sensing actual values of the predetermined operational parameter.

46. The system of claim 45 further comprising means for selecting a desired value of the predetermined operational parameter, the desired value of the predetermined operational parameter being selected based on the sensed throttle notch and/or the value of the parameter indicative of the environmental condition.

47. The system of claim 46 further comprising means for comparing the sensed value of the operational parameter against the desired value of that operational parameter.

48. The system of claim 47 wherein the intercooling system is actuated based on the output of the comparison means to maintain the actual value of the operational parameter within a band corresponding to a respective throttle notch and/or environmental condition.

49. The system of claim 33 wherein the actuating means includes means for determining whether the throttle notch position corresponds to a partial engine load and/or speed condition.

50. The system of claim 33 wherein the engine is in one of the following equipment: locomotives, off-road vehicles, marine vessels and power generation equipment.

51. A control system for controlling a medium-speed compression ignition engine, the engine operable in a selected one of a plurality of engine throttle notches, each throttle notch indicative of a respective load and/or speed condition of the engine, the engine having an intercooling system using a predetermined cooling fluid, the engine being configured to receive a predetermined combustion-supporting fluid into a plurality of cylinders through a respective intake manifold, the system comprising:

a sensor coupled to sense the selected throttle notch;

a sensor coupled to sense a predetermined parameter indicative of a respective ambient condition; and a control module configured to selectively actuate the intercooling system to adjust a predetermined operational parameter based on the sensed throttle notch and/or the value of the parameter indicative of the respective ambient condition.

52. The system of claim 51 wherein the sensed parameter indicative of the predetermined ambient condition is ambient temperature.

53. The system of claim 51 wherein the sensed parameter indicative of the predetermined ambient condition is inlet air temperature.

54. The system of claim 51 wherein the sensed parameter indicative of the predetermined ambient condition is barometric pressure.

55. The system of claim 51 wherein the sensed parameter indicative of the predetermined ambient condition is selected from the group consisting of ambient temperature, inlet air temperature, and atmospheric pressure.

56. The system of claim 51 wherein the predetermined combustion-supporting fluid is air.

57. The system of claim 51 wherein the operational parameter to be adjusted is intake manifold air temperature.

58. The system of claim 51 wherein the predetermined operational parameter to be adjusted is coolant fluid temperature.

59. The system of claim 51 wherein the predetermined operational parameter to be adjusted is intake manifold air temperature and/or coolant temperature.

60. The system of claim 56 further comprising a sensor for sensing temperature of air discharged from a compressor and for generating a signal indicative of said temperature, the control module for selectively actuating the intercooler system being further responsive to the signal generated by said sensor.

61. The system of claim 56 wherein the control module is further configured to control flow of the cooling fluid in the intercooling system to adjust the predetermined operational parameter.

62. The system of claim 51 further comprising a sensor coupled to sense actual values of the predetermined operational parameter.

63. The system of claim 62 further comprising a module configured to select a desired value of the predetermined operational parameter, the desired value of the predetermined operational parameter being selected based on the value of the parameter indicative of the respective ambient condition and the engine throttle notch.

64. The system of claim 63 further comprising a comparator coupled to compare the sensed value of the operational parameter against the desired value of that operational parameter to supply a comparator output signal.

65. The system of claim 64 wherein the intercooling system is actuated based on the value of the comparator output signal to maintain the actual value of the operational parameter within a band corresponding to a respective engine throttle notch and ambient condition.

66. The system of claim 51 wherein the control module includes a submodule for determining whether the throttle notch corresponds to a partial engine load and/or speed condition.

67. The system of claim 51 wherein the engine is configured to energize one of the following equipment: locomotives, off-road vehicles, marine vessels and power generation equipment.

\* \* \* \* \*

UNITED STATES PATENT AND TRADEMARK OFFICE
CERTIFICATE OF CORRECTION

PATENT NO. : 6,283,100 B1  
DATED : September 4, 2001  
INVENTOR(S) : Chen et al.

Page 1 of 1

It is certified that error appears in the above-identified patent and that said Letters Patent is hereby corrected as shown below:

<u>Title page,</u>
Item [75] should read as follows, -- Shawn Michael Gallagher (in lieu of Michael Shawn Gallagher). --

Signed and Sealed this

Fourteenth Day of May, 2002

*Attest:*

*Attesting Officer*

JAMES E. ROGAN  
*Director of the United States Patent and Trademark Office*